US008971302B2

(12) United States Patent
Lee et al.

(10) Patent No.: US 8,971,302 B2
(45) Date of Patent: Mar. 3, 2015

(54) CLUSTER-BASED DERIVATION OF ANTENNA TILTS IN A WIRELESS NETWORK

(75) Inventors: Hyun Ok Lee, San Ramon, CA (US); Vibhav Arun Kapnadak, Milpitas, CA (US); Fereidoun Tafreshi, Bellevue, WA (US); Xiaojun Tang, Milpitas, CA (US); Ernest Tinyork Tsui, Pleasanton, CA (US); Gustavo Enrique Ulffe Whu, Johns Creek, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 233 days.

(21) Appl. No.: 13/312,631

(22) Filed: Dec. 6, 2011

(65) Prior Publication Data
US 2013/0142183 A1 Jun. 6, 2013

(51) Int. Cl.
*H04W 24/00* (2009.01)
(52) U.S. Cl.
USPC ........................................................... 370/338
(58) Field of Classification Search
CPC ..... H04W 84/18; H04W 84/12; H04W 84/04; H04W 74/08
USPC ................... 370/338, 328, 310, 332
See application file for complete search history.

(56) References Cited

U.S. PATENT DOCUMENTS

2005/0250542 A1* 11/2005 Aoyama et al. ............ 455/562.1
2008/0096566 A1* 4/2008 Brunner et al. ................ 455/437
2008/0244069 A1* 10/2008 Funato et al. .................. 709/224
2011/0130137 A1* 6/2011 Sanders et al. ................ 455/424
2012/0207013 A1* 8/2012 Kamalaraj et al. ............ 370/218
2013/0143541 A1* 6/2013 Henderson et al. ........... 455/418

OTHER PUBLICATIONS

"AIRCOM launches OPTIMA 7.0" Leatherhead, Nov. 15, 2011, http://www.techrecur.com/2011/11/15/aircom-launches-optima-7-0/[Mar. 19, 2012 12:00:53 PM].
"ariesoACP", 2012, http://www.arieso.com/products/ariesoACP.html.
"ariesoGEO", 2012, http://www.arieso.com/products/ariesoGEO.html.
"Intucell—Automatic Neighbor Relations", 2011, http://intucellsystems.com/products/automatic-neighbor-relations/.

(Continued)

*Primary Examiner* — Andrew Lai
*Assistant Examiner* — Zhiren Qin
(74) *Attorney, Agent, or Firm* — Amin, Turocy & Watson, LLP

(57) ABSTRACT

Systems, methods, and apparatus for cluster-based optimization of antenna tilts in a wireless network are presented herein. A screening component can receive information indicating wireless conditions of respective wireless access points of a geographical region, select, based on a performance criterion, an access point of the respective wireless access points, and group the access point and an other access point of the respective wireless access points into a representation of a cluster of access points. Further, an optimization component can derive antenna tilt values for respective access points of the cluster of the access points in response to a simulation of an application of the antenna tilt values to the respective access points. Furthermore, an implementation component can direct the antenna tilt values to respective components of the respective access points.

19 Claims, 12 Drawing Sheets

(56) References Cited

OTHER PUBLICATIONS

"Intucell—Carrier Management", 2011, http://intucellsystems.com/products/carrier-management/.

Kamakshi Sridhar, "Extended Son Essential for Optimized LTE Networks", Jul. 18, 2011, http://www2.alcatel-lucent.com/blogs/techzine/2011/extended-son-essential-for-optimized-lte-networks/ [Mar. 19, 2012 1:16:54 PM].

Intucell, Oct. 30, 2011, "Feedback as an integral part of automated optimization", http://intucellsystems.com/intucell/feedback-as-an-integral-part-of-automated-optimization/.

Reverb Networks—Intelligent Son Solutions, "Interference Reduction", 2012, http://www.reverbnetworks.com/content/interference-reduction.

AIRCOM International "I-View Live Plan", 2012, http://www.aircominternational.com/Products/PerformanceandConfiguration/i-view-live-plan.aspx[Mar. 19, 2012 1:40:16 PM].

Alcatel-Lucent 9900 Wireless Network Guardian, 2012, http://www.alcatel-lucent.com/.../products/detail?LMSG_CABINET=Solution_Product_Catalog&LMSG_CONTENT_FILE=Products/Product_Detail_000590.xml [Mar. 19, 2012 1:41:37 PM].

"Intucell—Load Balancing", 2011, http://intucellsystems.com/products/load-balancing/[Mar. 19, 2012 1:45:30 PM].

Reverb Networks—Intelligent Son Solutions, "Load Balancing", http://www.reverbnetworks.com/content/load-balancing[Mar. 19, 2012 1:50:54 PM].

Alcatel-Lucent, "Network Optimization", http://www.alcatel-lucent.com/wireless/network_optimization.html[Mar. 19, 2012 1:56:49 PM].

"Intucell—Multiple products on a single SON platform", 2011, http://intucellsystems.com/products/overview/.

AIRCOM International "Optimising Wireless Network, Performance & Configuration Products", http://www.aircominternational.com/Products.aspx[Mar. 19, 2012 2:01:26 PM].

Reverb Networks—Intelligent SON Solutions, "Self Healing" http://www.reverbnetworks.com/content/self-healing [Mar. 19, 2012 2:04:03 PM].

"Intucell—Forget About Optimization", 2011, http://intucellsystems.com/technology/overview/[Mar. 19, 2012 2:05:37 PM].

"Intucell—Using RF Shaping for Self Optimizing Networks", Sep. 14, 2011, http://intucellsystems.com/intucell/using-rf-shaping-for-self-optimizing-networks/[Mar. 19, 2012 2:07:27 PM].

Reverb Networks—"The Pioneer and Leader in Antenna-based SON", http://www.reverbnetworks.com/[Mar. 19, 2012 2:09:23 PM].

Reverb Networks—"SON Manager Concept with Application to Heterogeneous Networks", © 2011 Reverb Networks, Inc., http://www.reverbnetworks.com/content/son-manager-concept-application-heterogeneous-networks.

Reverb Networks—"SON Manager Concept with interaction and interoperability of SON features", © 2011 Reverb Networks, Inc., http://www.reverbnetworks.com/content/son-manager-concept-interaction-and-interoperability-son-features.

RFS, "Optimizer RT Version 2.0.2.2, Operator Manual for Antenna Control System", Doc No. 31045H000, Issue 6, Mar. 2005.

Reverb Networks—"Benefits of antenna tilt based SON", © 2011 Reverb Networks, Inc., http://www.reverbnetworks.com/content/benefits-antenna-tilt-based-son.

Osman Nuri Can Yilmaz, "Self-Optimization of Coverage and Capacity in LTE using Adaptive Antenna Systems" AALTO University Abstract of the Master's Thesis, Feb. 19, 2010.

Reverb Networks—"Comparison of Antenna-based and Parameter-based SON with Load-Balancing and Self-Healing Cases", © 2011 Reverb Networks, Inc., http://www.reverbnetworks.com/content/comparison-antenna-based-and-parameter-based-son-load-balancing-and-self-healing-cases.

Reverb Networks—PerformaBeams® SON Modules, http://www.reverbnetworks.com/sites/default/files/performabeams_brochure.pdf, Last Accessed Mar. 19, 2012.

CSS Antenna, "Primary Control Unit (PCU) Installation and Operations Manual", PCU-100 and PCU-200 Version 3.2, www.cssantenna.com, Last Accessed Mar. 19, 2012.

Motorola—"LTE Operations and Maintenance Strategy—Using Self-Organizing Networks to Reduce Opex", http://www.motorola.com/web/Business/Solutions/Industry%20Solutions/Service%20Providers/Network%20Operators/LTE/_Document/Static%20Files/LTE%20Operability%20SON%20White%20Paper.pdf, Last Accessed Mar. 19, 2012.

* cited by examiner

CLUSTER-BASED DERIVATION OF ANTENNA TILTS IN A WIRELESS NETWORK

TECHNICAL FIELD

This disclosure relates generally to cluster-based derivation of antenna tilts in a wireless network.

BACKGROUND

In a wireless network, received signal strength at a receiver can be determined by various factors including transmit antenna gain, receive antenna gain, and/or radio frequency (RF) attenuation mechanisms such as distance-dependent path loss, shadowing, and multi-path fading. Effective transmit antenna gain for a radio link can be based on relative (horizontal and vertical) angles of the receiver with respect to a transmit antenna of a transmitting cell. Therefore, an effective gain of the transmit antenna can be changed by adjusting a tilt value of the transmit antenna, which can change the received signal strength at the receiver.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative, non-limiting embodiments in a simplified form as a prelude to the more detailed description of the various embodiments that follow. It will also be appreciated that the detailed description may include additional or alternative embodiments beyond those described in this summary.

In accordance with one or more embodiments and corresponding disclosure, various non-limiting aspects are described in connection with cluster-based derivation of antenna tilts in a wireless network, e.g., optimized derivation of antenna tilts of a cellular-based wireless network.

For instance, a method includes receiving information that is associated with respective wireless access points of a region. In one example, the information can be received from the wireless access points, e.g., associated with macro cell(s), pico cell(s), femto cell(s), etc. across multiple wireless network environments (e.g., a Global System for Mobile Communication (GSM) wireless environment, a Universal Mobile Telecommunication System (UMTS) wireless environment, a Long Term Evolution (LTE™) wireless environment, etc.), across multiple wireless network service providers, across multiple frequency bands and/or communication channels, etc.

In another example, the information can indicate wireless coverage, measurement data of wireless signal(s), interference of the wireless signal(s), performance data, e.g., Reference Signal Received Power (RSRP), Reference Signal Received Quality (RSRQ), Received Signal Code Power (RSCP), received energy per chip divided by power density of an associated band (Ec/No), etc. associated with the wireless signal(s), configuration parameter(s) of an access point, location of an access point and/or a wireless coverage area including the access point, etc.

Further, a method can include selecting, based on a criterion, a target access point of the respective wireless access points. In one example, the criterion can be associated with a strength of a wireless signal, an interference of the wireless signal, a key performance indicator (KPI) associated with the wireless signal, etc. Furthermore, the method includes creating a representation of a cluster of access points including the target access point and neighbor access point(s) of the target access point. In an aspect, the target access point and the neighbor access point(s) are associated with overlapping coverage area(s). Then, in response to estimating an impact of making tilt changes to antennas of the target access point and the neighbor access point(s), determining antenna tilt parameters for the target access point and the neighbor access point(s).

In an embodiment, the determining the antenna tilt parameters for the target access point and the neighbor access point(s) includes calculating the antenna tilt parameters based on respective locations of mobile devices communicatively coupled to the target access point and/or the neighbor access point(s).

In one example, creating the representation of the cluster can include selecting the neighbor access point(s) for the cluster based on a portion of the information that is associated with a mobile device, or user equipment (UE), being communicatively coupled to the target access point. In another embodiment, the selecting the neighbor access point(s) further includes selecting the neighbor access point(s) based on a measurement, e.g., a UE measurement report of the UE being communicatively coupled to the target access point, an intra-frequency measurement, an inter-frequency measurement, an inter-radio access technology (RAT) measurement, etc. associated with the neighbor access point(s), etc. Furthermore, the method includes directing the antenna tilt parameters, or a change of the antenna tilt parameters, to component(s), e.g., antenna(s), etc. of the target access point and the neighbor access point(s), e.g., for setting transmit antenna gain, for improving wireless coverage of associated cells, for improving interference between neighbor access points, cells, etc.

In one embodiment, the various systems and methods can include creating a representation of another cluster including another target access point of the wireless access points and neighbor access point(s) of the other target access point. Then, for example, in response to the cluster including an access point of the other cluster, the cluster can be merged with the other cluster to obtain a merged cluster. Further, the methods can include estimating an impact of making tilt changes to antennas of respective access points of the merged cluster, and, in response to the estimating, determining the antenna tilt parameters for the respective access points of the merged cluster.

In one non-limiting implementation, a screening component can receive information indicating wireless conditions of respective wireless access points of a geographical region. Further, the screening component can select, based on a performance criterion, an access point of the respective wireless access points. In one embodiment, the performance criterion can be associated with a strength of a wireless signal, an interference of the wireless signal, etc. Furthermore, the screening component can group the access point and another access point of the respective access points into a representation of a cluster of access points, e.g., associated with overlapping coverage areas.

In another embodiment, the screening component can group the access point and the other access point into the representation of the cluster of the access points based on a portion of the information that is associated with a mobile device, or UE, being communicatively coupled to the access point. In yet another embodiment, the portion of the information can be associated with a measurement being performed by the mobile device, e.g., associated with a UE measurement report, etc.

Moreover, an optimization component can derive antenna tilt values for respective access points of the cluster of the access points in response to a simulation of an application of the antenna tilt values to the respective access points, e.g., based on the information, antenna model(s), etc. In yet another embodiment, the simulation can include an estimation of an impact of the application of the antenna tilt values on signal quality indicators, e.g., KPI metric(s), etc. associated with the wireless conditions. In an embodiment, the simulation can include an estimation of an impact of the application of the antenna tilt values in a first wireless access technology on a wireless condition of an access points associated with a second wireless access technology.

In another embodiment, the optimization component can derive the antenna tilt values for the respective access points of the cluster based on respective locations of mobile devices communicatively coupled to the respective access points of the cluster.

In one embodiment, the screening component can merge the cluster of the access points with another cluster of access points, e.g., including common access point(s), to obtain a disjoint cluster. Further, the optimization component can derive antenna tilt values of respective access points of the disjoint cluster.

In another non-limiting implementation, an implementation component can direct a change of the antenna tilt values to the respective access points. In yet another non-limiting implementation, the implementation component, e.g., utilizing a feedback component, can receive other information from the wireless access points, and determine whether to update and/or rescind the antenna tilt values based on the other information. For example, the implementation component, or feedback component, can initiate a new screening and/or an optimization of the cluster of access points based on the other information. In another example, the implementation component can monitor wireless conditions of the cluster of the access points in response to a direction of the change of the antenna tilt values to the respective access points. Further, in response to a detection of a negative impact associated with the direction of the change, the implementation component can direct another change of the antenna tilt values to the respective access points that is associated with previously applied antenna tilt values, e.g., to revert to antenna tilt values associated with improved performance.

Another non-limiting implementation can include receiving information indicating wireless conditions of respective wireless access points of a geographical region. Further, the method can include selecting a first access point of the respective wireless access points based on a performance criterion, e.g., indicating a violation of predefined signal quality measure(s)/metric(s), e.g., associated with wireless signal(s), wireless network performance, etc. Furthermore, the method can include including the first access point and a second access point of the respective wireless access points in a cluster of access points, and simulating antenna tilt values being applied to respective access points of the cluster of access points.

In another embodiment, a method can include directing the antenna tilt values towards the respective access points of the cluster of access points.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Figure 1:
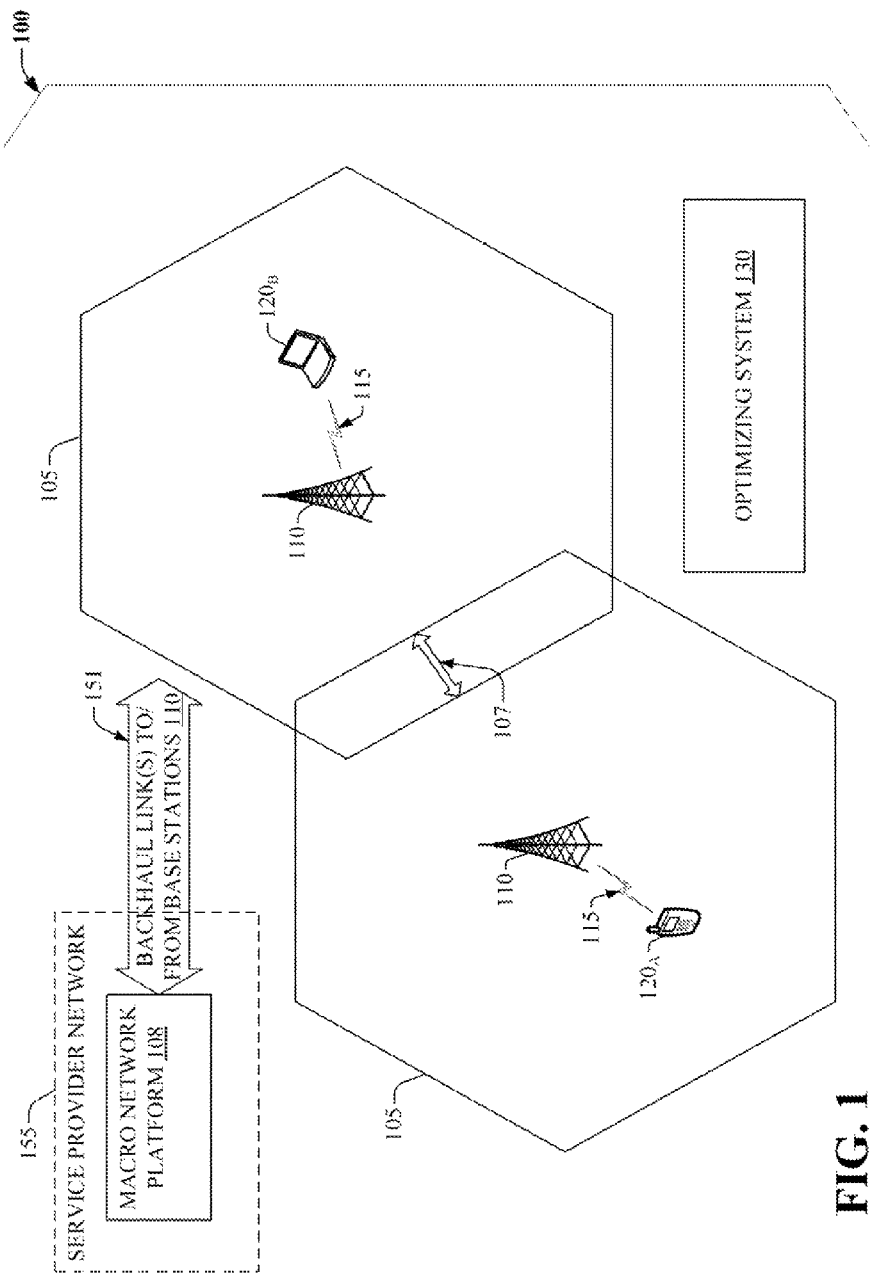
FIG. 1 illustrates a wireless environment including an optimizing system for optimizing antenna tilt values of cells within a cellular-based wireless network, in accordance with an embodiment.

It is noted that a change of the tilt value of a transmit antenna of a transmitting cell in a wireless system can affect a coverage area of the transmitting cell and interference generated in neighboring cells. The subject matter disclosed herein relates to deriving antenna tilt values of a cluster of access points, e.g., optimizing antenna values of the cluster of the access points. Indeed, embodiments of the subject disclosure may improve positioning of antenna configurations of cells within a wireless network.

In this regard, for the avoidance of doubt, any embodiments described herein below in the context of optimizing antenna tilts are not so limited, and should be construed to cover any techniques that implement underlying aspects or parts of the below-described systems and methods to improve positioning of antenna tilts in a wireless system, even if resulting in a sub-optimal variant obtained by relaxing aspects or parts of a given implementation or embodiment.

In one embodiment, a method comprises receiving information that is associated with respective wireless access points of a region; selecting, based on a criterion, a target access point of the respective wireless access points; creating a representation of a cluster of access points including the target access point and a neighbor access point of the target access point, and, in response to estimating an impact of making tilt changes to antennas of respective access points of the cluster, determining antenna tilt parameters for the respective access points.

In another non-limiting implementation, a system comprises a screening component configured to receive information indicating wireless conditions of respective wireless access points of a geographical region, select, based on a performance criterion, an access point of the respective wireless access points, and group the access point and another access point of the respective wireless access points into a representation of a cluster of access points. Further, an optimization component can derive antenna tilt values for respective access points of the cluster of the access points in response to a simulation of an application of the antenna tilt values to the respective access points.

In yet another non-limiting embodiment, a computer-readable storage medium is provided comprising computer executable instructions that, in response to execution, cause a computing device to perform operations. The operations can include receiving information indicating wireless conditions of respective wireless access points of a geographical region, selecting a first access point of the respective wireless access points based on a performance criterion; including the first access point and a second access point of the respective wireless access points into a cluster of access points, and simulating antenna tilt values being applied to respective access points of the cluster of access points. Further, the operations can include directing the antenna tilt values towards the respective access points of the cluster of access points.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment can be included in at least one embodiment. Thus, the appearances of the phrase "in one embodiment," or "in an embodiment," in various places throughout this specification are not necessarily all referring to the same embodiment. Furthermore, the particular features, structures, or characteristics may be combined and/or distributed in any suitable manner in one or more embodiments.

As used in this application, the terms "component," "module," "system," "interface," and the like, are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures and computer-executable instructions stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" can be used herein to mean serving as an example, instance, or illustration. For the avoidance of doubt, the subject matter disclosed herein is not limited by such examples. In addition, any aspect or design described herein as "exemplary" and/or "demonstrative" is not to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via screening component 310 (described below) to automatically select, based on a performance criterion, an access point of respective access points of a geographical region; and automatically create, generate, form, etc. a representation of a cluster of access points including the access point and another access point of the respective wireless access points, e.g., of overlapping wireless coverage area(s). Further, the artificial intelligence system can be used, via optimization component 320 (described below) to automatically simulate an application of (and derive) antenna tilt values, e.g., utilizing antenna model(s), based on information, e.g., indicating wireless conditions of the respective wireless access points, indicating respective locations of mobile devices communicatively coupled to the respective wireless access points, etc.

As used herein, the term "infer" or "inference" refers to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein encompasses in one or more embodiments a computer program accessible from any computer-readable device, computer-readable carrier, or computer-readable media. For example, computer-readable media can include, but are not limited to, at least one of: a magnetic storage device, e.g., hard disk; a floppy disk; a magnetic strip; an optical disk (e.g., compact disk (CD), digital video disc (DVD), Blu-ray Disc™ (BD)); a smart card; a flash memory device (e.g., card, stick, key drive); and/or a virtual device that emulates a storage device and/or any of the above computer-readable media.

Moreover, terms like "user equipment" (UE), "mobile station", "mobile subscriber station", "access terminal", "terminal", "handset", "appliance", "machine", "wireless communication device", "cellular phone" and similar terminology refer to a wireless device at least one of (1) utilized by a subscriber or user of a wireless communication service to receive and/or convey data associated with voice, video, sound, and/or substantially any data-stream or signaling-stream; or (2) utilized by a subscriber of a voice over internet protocol (VOIP) service that delivers voice communications over internet protocol (IP) networks such as the Internet or other packet-switched networks. Further, the foregoing terms are utilized interchangeably in the subject specification and related drawings.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence (see above), e.g., a capacity to make inference based on complex mathematical formalisms, that can provide simulated vision, sound recognition, decision making, etc.

Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

Aspects and/or features of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) LTE™; Third Generation Partnership Project 2 (3GPP2); Ultra Mobile Broadband (UMB); 3GPP UMTS; High Speed Packet Access (HSPA); High Speed Downlink Packet Access (HSDPA); High Speed Uplink Packet Access (HSUPA); LTE™ Advanced (LTE-A), GSM, Near Field Communication (NFC), code division multiple access (CDMA), Wibree, Zigbee, IEEE 802.xx wireless technologies, Wi-Fi Direct™, etc.

Additionally, one or more embodiments described herein can include legacy telecommunication technologies, e.g., plain old telephone service (POTS). Further, selections of a radio technology, or radio access technology, can include second generation (2G), third generation (3G), and fourth generation (4G) evolution of the radio access technology; however, such selections are not intended as a limitation of the disclosed subject matter and related aspects thereof. Further, aspects and/or features of the disclosed subject matter can be exploited in different or disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

The subject disclosure relates to systems, methods, and apparatus that optimize antenna tilt values of cells within a wireless network. In one aspect, the wireless network can include a local wireless communications cite (or base station), which can use a licensed radio spectrum operated and/or controlled by a wireless service provider. A UE operated by a subscriber within a coverage area can communicate with a core network via the base station. Further, the UE can register with the base station and communication, e.g., voice traffic, data traffic, etc. can be routed to the subscriber through the base station utilizing the licensed radio spectrum. The base station can employ a backhaul network, e.g., broadband wired or wireless network backbone, to route packet communication, e.g., voice traffic, data traffic, etc. to the core network.

FIG. 1 illustrates a wireless environment 100 including an optimizing system 130 for optimizing antenna tilt values of a cluster of access points, in accordance with an embodiment. Each macro cell 105 represents a "macro" cell coverage area, or sector, served by a base station 110. It should be appreciated that although macro cells 105 are illustrated as parallelograms, macro cells 105 can adopt other geometries, or polygons, e.g., dictated by spatial data, deployment, or topography of the macro cell coverage area (or covered geographic area), e.g., metropolitan statistical area (MSA), rural statistical area (RSA), etc. Macro cell coverage can serve mobile wireless devices, e.g., mobile wireless device $120_A$, mobile wireless device $120_B$, etc. in outdoor and/or indoor locations. Overlapping coverage area 107 indicates a wireless coverage area common to macro cells 105. For example, overlapping coverage area 107 indicates a first access point of a first base station 110 can experience interference, detect wireless signals, etc. from a second access point of a second base station 110, and vice versa.

An over-the-air wireless link 115 provides the macro coverage, and includes a downlink (DL) and an uplink (UL) (both not shown) that can utilize a predetermined band of radio frequency (RF) spectrum associated with, e.g., GSM, 3GPP UMTS, LTE™, etc. Accordingly, mobile wireless device $120_A$ can be a GSM, 3GPP UMTS, LTE™, etc. mobile phone, while $120_B$ can be a remote computing device with GSM, 3GPP UMTS, LTE™, etc. capabilities.

Further, it should be appreciated that while aspects and/or features of the subject disclosure are illustrated in relation to macro cells 105, such aspects and/or features are also applicable, and can be implemented in: a micro cell, or micro cell access point; a pico cell, or pico cell access point; a femto cell, or femto cell access point; a Wi-Fi™ access point; a WiMAX™ access point; a Bluetooth™ access point; other wireless-based access points; or the like. Furthermore, base station 110 can be embodied in such access points. The term "macro cell" generally refers to a coverage area, or geographical area, having a radius, e.g., of at least one kilometer, for example, or less, e.g., if situated to serve an area of high subscriber demand. The terms "micro cell," "pico cell," and "femto cell" generally refer to progressively smaller sized coverage areas, which can additionally serve the UE, e.g., in indoor locations.

Base station 110—including associated electronics, circuitry and/or components—and wireless link 115 can form a radio network, e.g., base station subsystem (BSS) associated with a GSM wireless network, or radio access network (RAN) associated with a UMTS wireless network. In addition, base station 110 can communicate with macro network platform 108 via backhaul link(s) 151. Macro network platform 108 can represent a core network comprising one or more cellular wireless technologies, e.g., 3GPP UMTS, GSM, LTE™, etc. In one aspect, macro network platform 108 can control a set of base stations 110 that serve either respective cells or a number of sectors within such cells. Macro network platform 108 can also communicate with other base stations (not shown) that serve other cells (not shown). Backhaul link(s) 151 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 151 can link different or disparate base stations 110 based on macro network platform 108.

Packet communication, e.g., voice traffic, data traffic, can be routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 110 can be connected to the backhaul network, e.g., service provider network 155, via a broadband modem (not shown) and backhaul link(s) 151. Through backhaul link(s) 151, base station 110 can handle substantially any quality of service (QoS) for heterogeneous packetized traffic, e.g., various multiple packet flows.

Base station 110 can integrate into an existing network, e.g., GSM network, 3GPP network, LTE™ network, etc. via various interfaces, for example: via an A-bis interface (not shown) between a base transceiver station (BTS) and a base station controller (BSC); via an Iub interface (not shown) between a radio network controller (RNC) and base station 110; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

It should be appreciated that although optimizing system 130 is illustrated by FIG. 1 as an entity distinct from, e.g., macro network platform 108, base stations 110, service provider network 125, etc. aspects and/or features of optimizing system 130 can be located/included within and/or across one or more components, e.g., hardware, software, etc., of wireless network 100. For example, in one embodiment, aspects and/or features of optimizing system 130 can be located within any component(s) of a GSM, UMTS, or LTE™ core network, e.g. service provider network 155. In another embodiment, aspects and/or features of optimizing system 130 can be located and/or integrated in/with hardware and/or software of macro network platform 108, base station 110, service provider network 125, etc.

Figure 2:
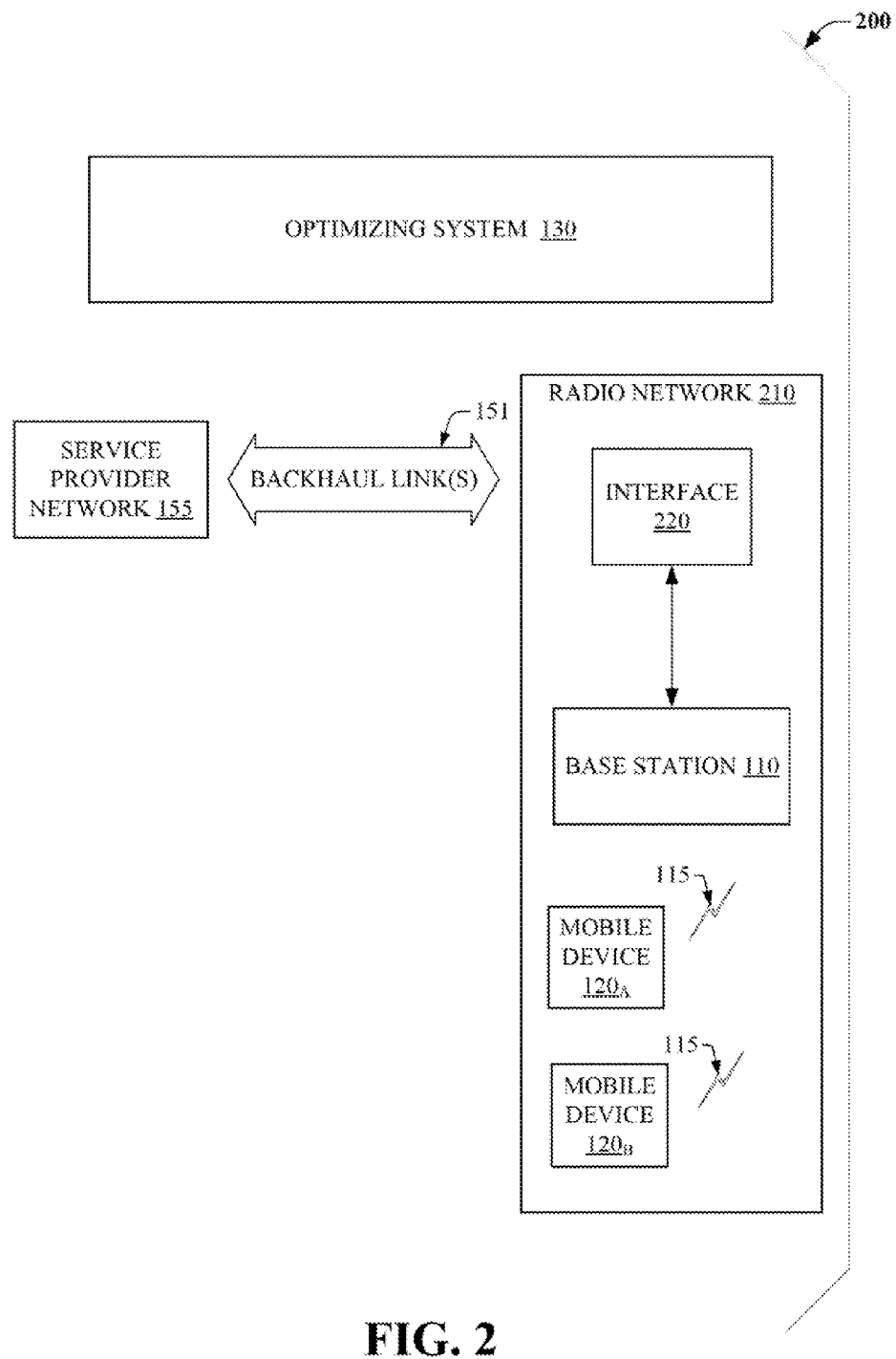
FIG. 2 illustrates another wireless environment including an optimizing system for optimizing antenna tilt values of cells within a cellular-based wireless network, in accordance with an embodiment.

Referring now to FIG. 2, a wireless environment (200) for optimizing antenna tilt values of cells within a cellular-based wireless network is illustrated, in accordance with an embodiment. Wireless environment 200 can comprise one or more base stations 110, for example: coupled to a BSC forming a base station system (BSS), coupled to an RNC forming a UMTS Terrestrial Radio Access Network (UTRAN), etc. via interface 220. Further, radio network 210 can couple to a core network, e.g., service provider network 155, via one or more backhaul links 151 (see above) to facilitate wireless communication and data transfer to one or more wireless devices, e.g., mobile wireless device 120$_A$/mobile wireless device 120$_B$, in accordance with the disclosed subject matter. Radio network 210 can comprise any wireless technology, e.g., GSM, UMTS, LTE™, etc.

Wireless environment 200 includes optimizing system 130 that can improve customer experience(s) within a wireless environment by grouping target wireless access points(s) and respective neighboring wireless access point(s) within radio network 210 into cluster(s), or respective representations of the cluster(s), for optimization of antenna tilts of such wireless access points. Further, optimizing system 130 can estimate an impact of tilt changes on performance metrics of the target and neighboring access points, or cells, before implementing the tilt changes.

Furthermore, optimizing system 130 can be used via any wireless technology implementing wireless access points(s), e.g., GSM, 3GPP UMTS, LTE™, etc. Moreover, it should be appreciated that although optimizing system 130 is illustrated by FIG. 2 as an entity distinct from, e.g., radio network 210, service provider network 155, etc. aspects and/or features of optimizing system 130 can be located/included within and/or across one or more components, e.g., hardware, software, etc., of wireless environment 200, e.g., within or among hardware and/or software of components of radio network 210, interface 220, and/or service provider network 155.

Further, one or more aspects of wireless environment 200, and the wireless environments, networks, systems, apparatus, and processes explained herein, can constitute machine-executable instructions embodied within machine(s), e.g., embodied in one or more computer readable mediums (or media) associated with one or more machines. Such instructions, when executed by the one or more machines, e.g., computer(s), computing device(s), virtual machines(s), etc. can cause the machine(s) to perform operations described.

Additionally, the systems and processes can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Figure 3:
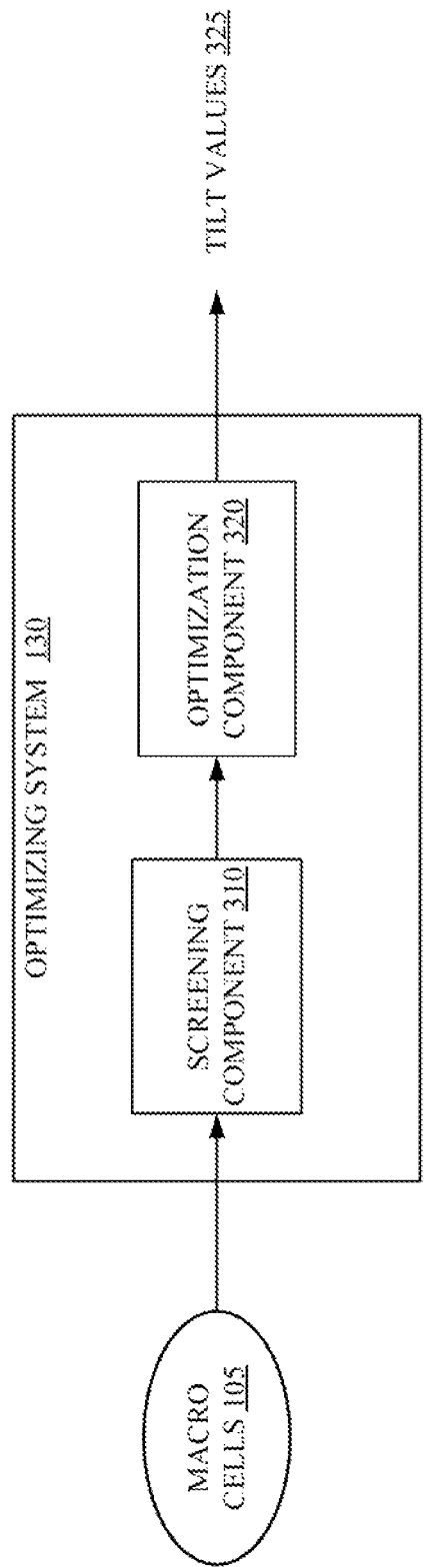
FIG. 3 illustrates an optimizing system for optimizing antenna tilt values of cells within a cellular-based wireless network, in accordance with an embodiment.

FIG. 3 illustrates optimizing system 130 including a screening component 310 and an optimization component 320, in accordance with an embodiment. Screening component 310 can be configured to receive information, from wireless access points of macro cells 105 associated with a geographical region, indicating respective wireless conditions of the wireless access points. In one embodiment, the information can indicate wireless coverage of the wireless access points, measurement data of wireless signal(s) received/transmitted by wireless access points, interference of the wireless signal(s), performance data, e.g., RSRP, RSRQ, RSCP, Ec/No, etc. associated with the wireless signal(s), configuration parameter(s) of the wireless access points, respective locations of the wireless access points, etc.

Further, screening component 310 can be configured to select, based on a performance criterion, an access point, or a target access point, of the wireless access points. In one embodiment, the performance criterion can be associated with a strength of a wireless signal, an interference of the wireless signal, a key performance indicator (KPI) associated with the wireless signal, a quality of the wireless signal, etc. For example, the performance criterion can indicate a violation of predefined signal quality measure(s)/metric(s), wireless network performance, etc. indicating such criterion not being met. Furthermore, screening component 310 can be configured to create, generate, form, etc. a cluster of access points, e.g., associated with overlapping wireless coverage area 107, including the target access point and one or more neighboring, e.g., within overlapping wireless coverage area 107, wireless access points of the wireless access points. In an aspect, the one or more neighboring wireless access points can be included in the cluster of access points based on UE measurement reports from UEs communicatively coupled to the target access point.

In another embodiment, screening component 310 can further be configured to merge the cluster of the access points with another cluster of access points, e.g., formed by screening component 310 in response to selection of another target access point of the wireless access point, to obtain a disjoint cluster of access points. As described below, optimization component 320 can derive antenna tilt values of respective access points, e.g., of the disjoint cluster of access points.

Optimization component 320 can be configured determine, or derive, antenna tilt values, or an optimal set of remote electrical tilt (RET) values, e.g., tilt values 325, for respective access points of the cluster, or the disjoint cluster, e.g., by simultaneously maximizing performance metrics, capacity measures, etc. of such cluster(s), for example, while meeting constraints imposed by predefined performance criteria, KPI metrics, RF quality indicators, etc. by simulating RET values being applied to, e.g., component(s) of, etc. the respective access points, e.g., based on antenna models of the respective access points, based on the information indicating the respective wireless conditions of the wireless access points, etc.

In one embodiment, the simulating the RET values includes estimating an impact of the RET values being applied to the respective access points on signal quality indicators associated with the wireless conditions. In another embodiment, the simulating the RET values includes estimating the impact of the RET values being applied in a first wireless access technology on a wireless condition of an access point associated with a second wireless access technology.

In another embodiment, optimizing component 320 can be configured to derive, calculate, etc. the antenna tilt values for the respective access points of the cluster based on respective locations of mobile devices communicatively coupled to the respective access points of the cluster. For example, the antenna tilt values can indicate that antennas of the respective access points be directed, e.g., via implementation component 410 described below, towards a direction associated with a location, a propagation of electromagnetic radiation, etc. that is associated with a majority of the mobile devices communicatively coupled to the respective access points of the cluster.

Figure 4:
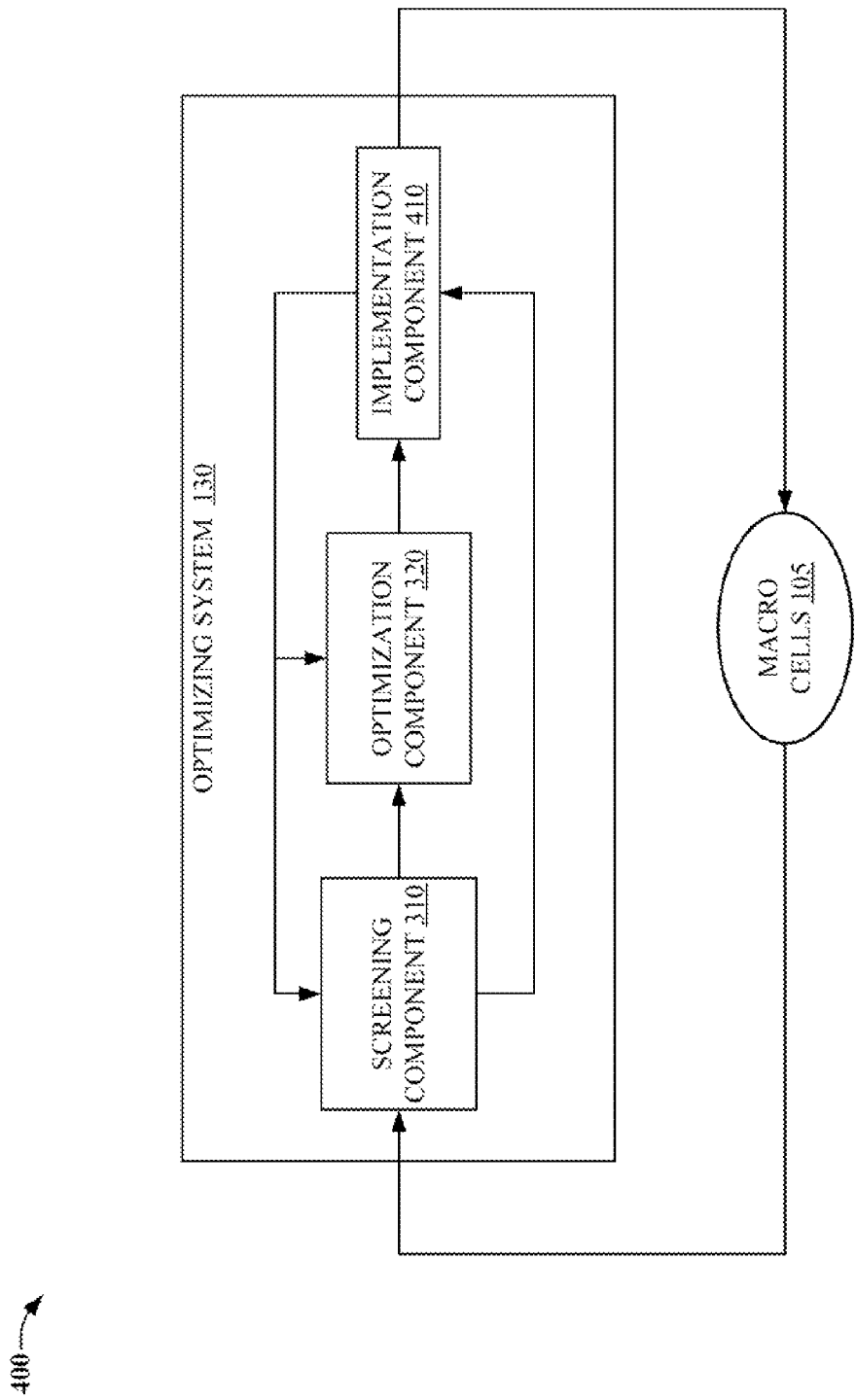
FIG. 4 illustrates an optimizing system including an implementation component for optimizing antenna tilt values of cells within a cellular-based wireless network, in accordance with an embodiment.
Figure 5:
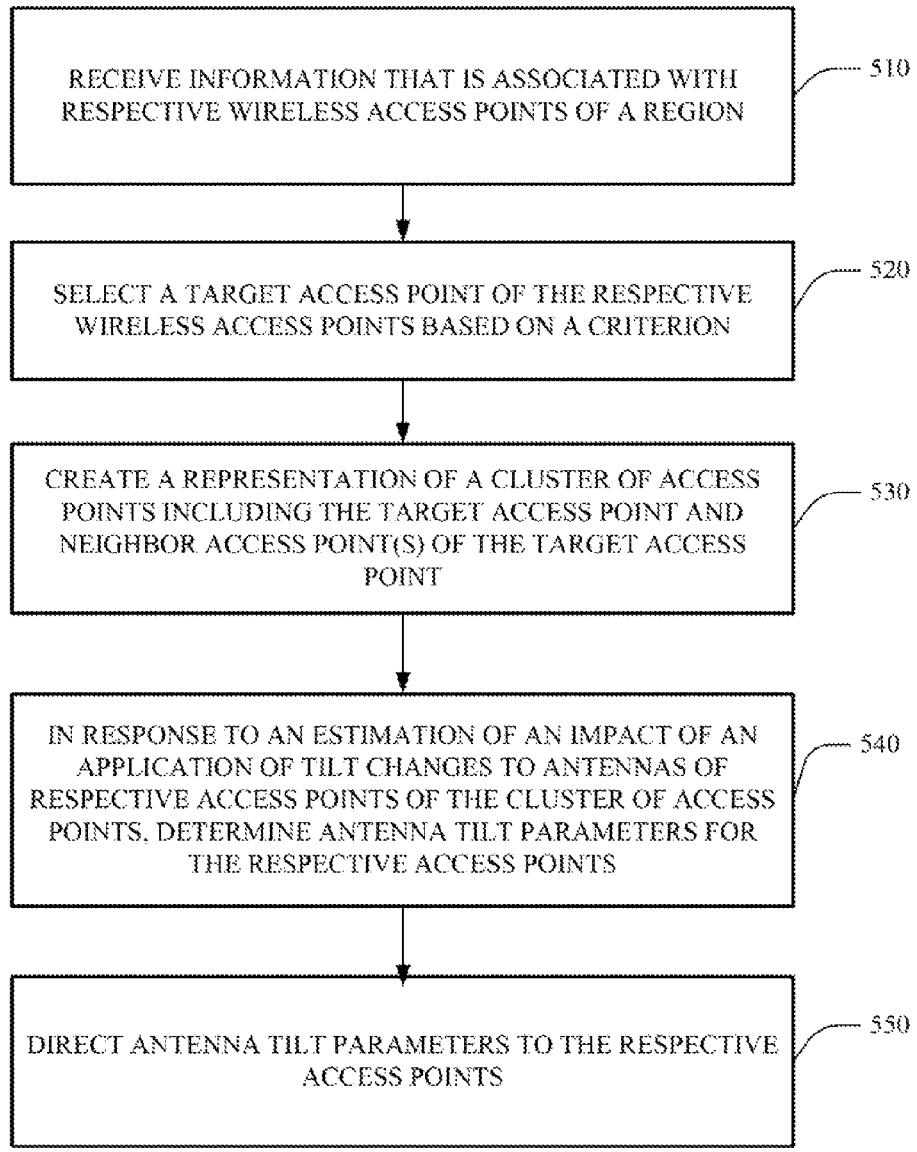
FIGS. 5-9 illustrate illustrative processes according to various embodiments.

Now referring to FIG. 4, optimizing system 130 including implementation component 410 is illustrated, in accordance with an embodiment. Implementation component 410 can be configured to direct a change of antenna tilt values, or direct the optimal set of RET values, to the respective access points of the cluster, e.g., to access points of macro cells 105.

In yet another embodiment, implementation component 410 can be utilized as a feedback component. For example, implementation component 410 can monitor an impact of tilt changes applied to, directed to, etc. respective antennas of the access points of macro cells 105. In an aspect, implementation component 410 can receive, e.g., via screening component 310, change information indicating respective changes in wireless conditions of the access points of macro cells 105 based on the change of the antenna tilt values directed to the access points. Further, implementation component 410 can determine whether to direct screening component 310 and/or optimization component 320 to update, re-optimize, re-derive, reinstate, revoke, rescind, etc. RET values of the access points of macro cells 105, e.g., based on a comparison of the change information with constraints imposed by the predefined performance criteria, KPI metrics, RF quality indicators, etc.

For example, in response to screening component 310 determining that a change in RET values made to the respective antennas negatively impacted a performance of an associated network, the change in RET values can be rescinded, revoked, etc. by implementation component 310, and implementation component 310 can revert to, reinstate, etc. previously applied RET values associated with improved performance.

FIGS. 5-9 illustrate methodologies in accordance with the disclosed subject matter, e.g., associated with optimizing component 130 described above. For simplicity of explanation, the methodologies are depicted and described as a series of acts. It is to be understood and appreciated that embodiments described herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, can encompass a computer program accessible from any computer-readable device, carrier, or media.

Referring now to FIGS. 5-9, processes (500, 600, 700, 800, 900) are illustrated, in accordance with various embodiments. At 510, information that is associated with respective wireless access points of a region can be received. At 520, a target access point of the respective wireless access points can be selected based on a criterion. At 530, a representation of a group, or cluster, of access points including the target access point and neighbor access point(s) of the target access point, e.g., within a common wireless coverage area, can be created, formed, etc. In an aspect, the representation of the cluster can be created by selecting the neighbor access point(s) based on UE measurements reported by a UE communicatively coupled to the target access point. At 540, in response to an estimation of an impact of an application of tilt changes to antennas of respective access points of the cluster of access points, antenna tilt parameters for the respective access points can be determined. In one embodiment, the estimation can be based on respective locations of mobile devices communicatively coupled to the respective access points. For example, the estimation can maximize the impact of the application of tilt changes by determining the antennas to be tilted towards a direction associated with a location, direction of propagation of electromagnetic radiation, etc. associated with a majority of the mobile devices communicatively coupled to the respective access points of the cluster. At 550, the antenna tilt parameters can be directed to the respective access points of the cluster of access points.

Figure 6:
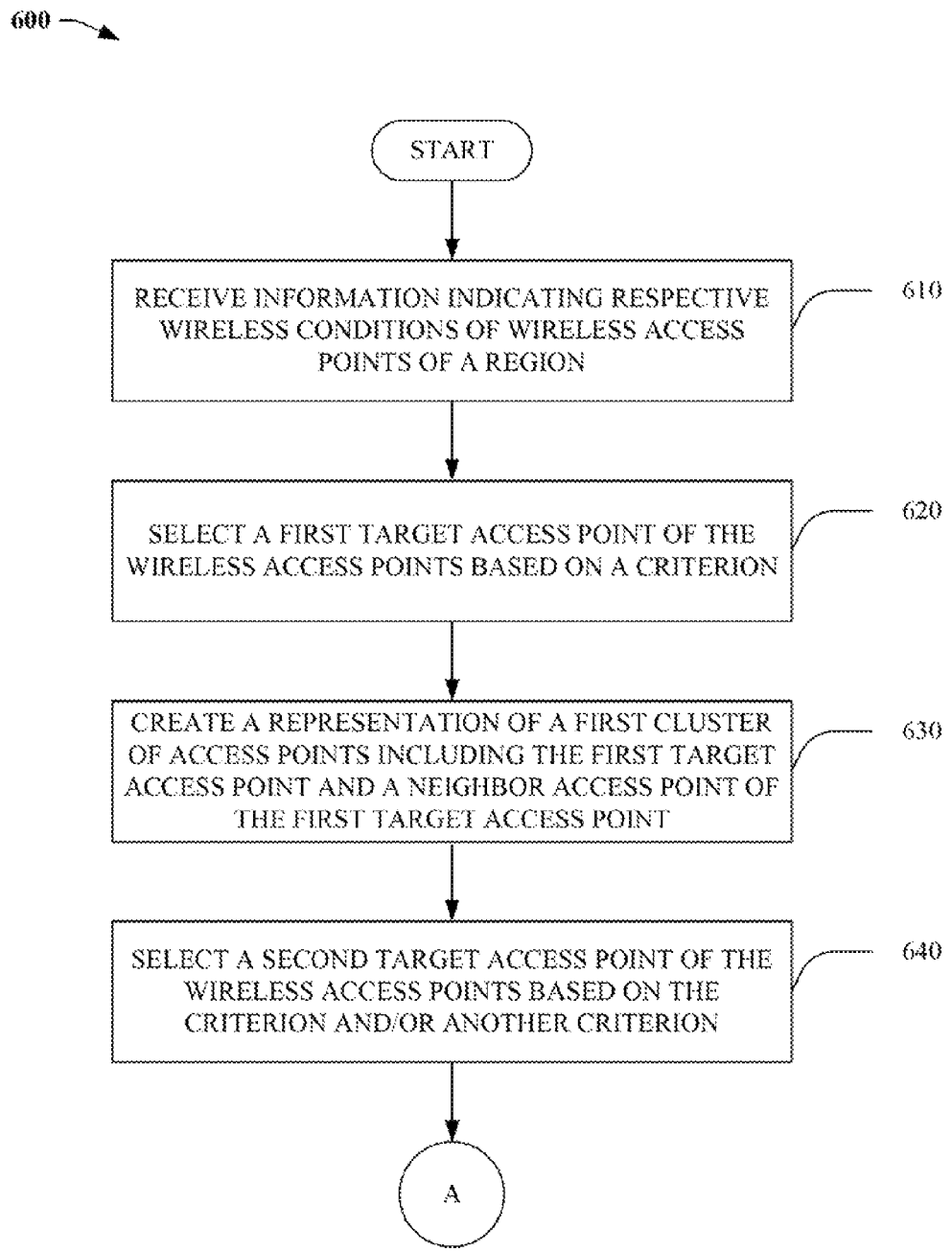
Figure 7:
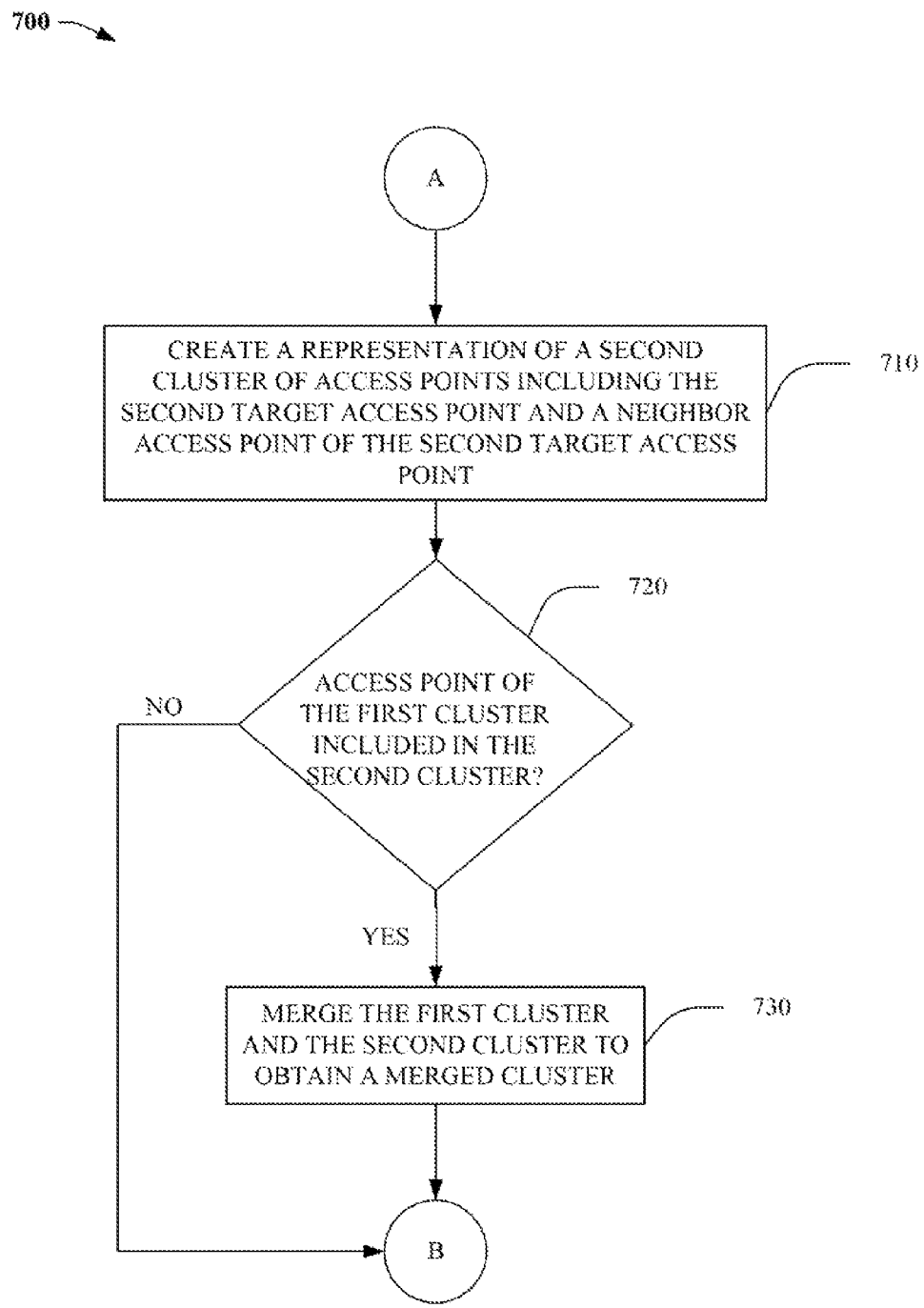
Figure 8:
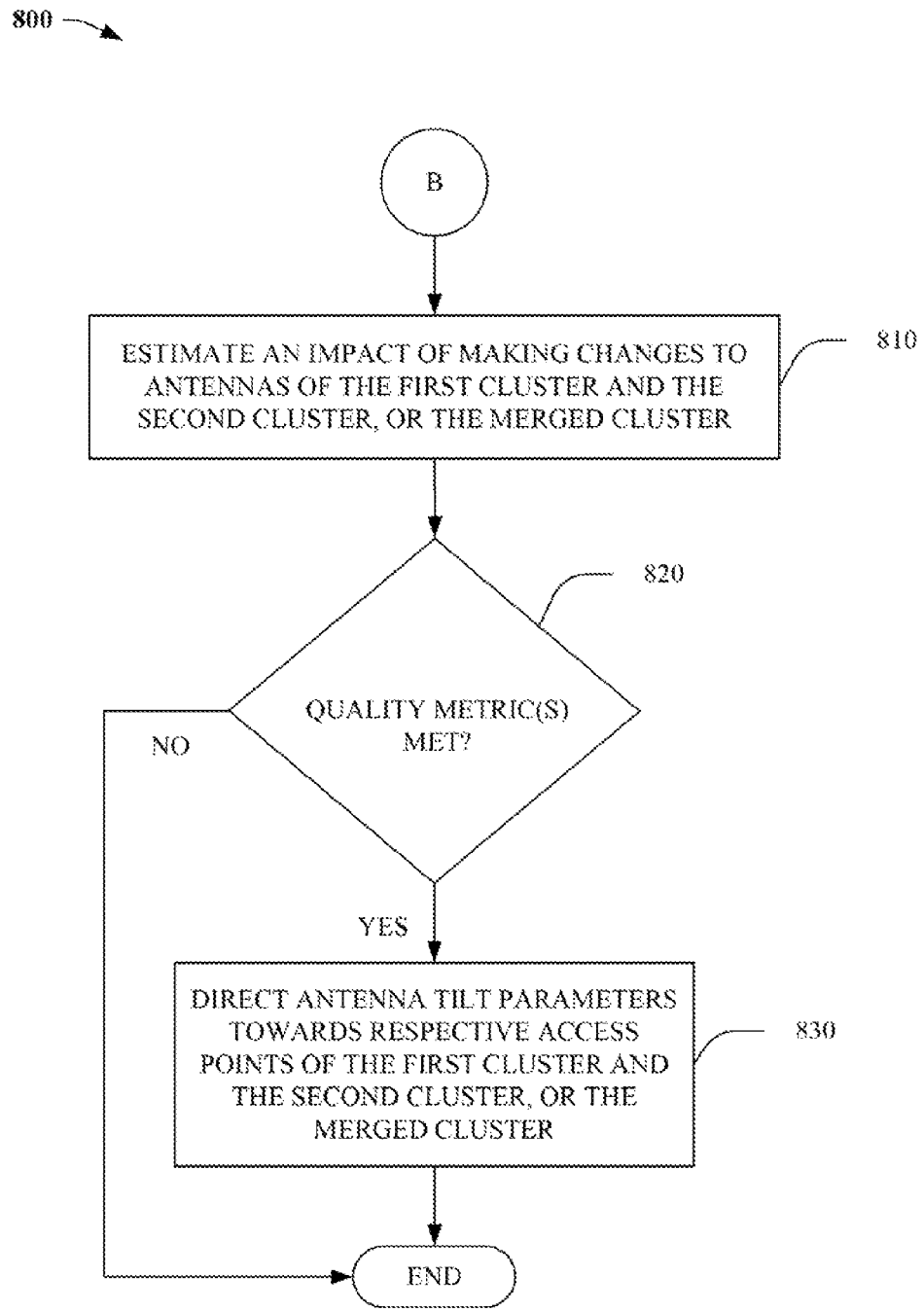

Now referring to FIG. 6, at 610, information indicating respective wireless conditions of wireless access points of a region can be received, e.g., from the wireless access points. At 620, a first target access point of the wireless access points can be selected based on a criterion, e.g., in response to the information indicating detected performance associated with wireless condition(s) of the first target access point does not meet, or violates, the criterion. At 630, a representation of a first cluster of access points including the first target access point and a neighbor access point of the first target access point can be created, formed, derived, etc. At 640, a second target access point of the wireless access points can be selected based on the criterion and/or another criterion.

Flow continues from 640 to 710, at which a representation of a second cluster of access points including the second target access point and a neighbor access point of the second target access point can be formed. At 720, it can be determined whether an access point of the first cluster is included in the second cluster. If it is determined the access point is included in the second cluster, flow continues to 730, at which the first cluster can be merged with the second cluster to obtain, or form, a merged cluster and flow continues to 810; otherwise process 700 continues to 810.

At 810, an impact of making changes to antennas of the first and second clusters, or the merged cluster, can be estimated, e.g., via simulation(s) described above. At 820, it can be determined whether the estimation of the impact meets RF quality metric(s) and/or wireless performance criterion, e.g., as described above. If it is determined the estimation meets the RF quality metric(s) and/or the wireless performance criterion, then flow continues to 830, at which antenna tilt parameters can be directed towards respective access points of the first cluster and the second cluster, or the merged cluster; otherwise process 800 ends.

Figure 9:
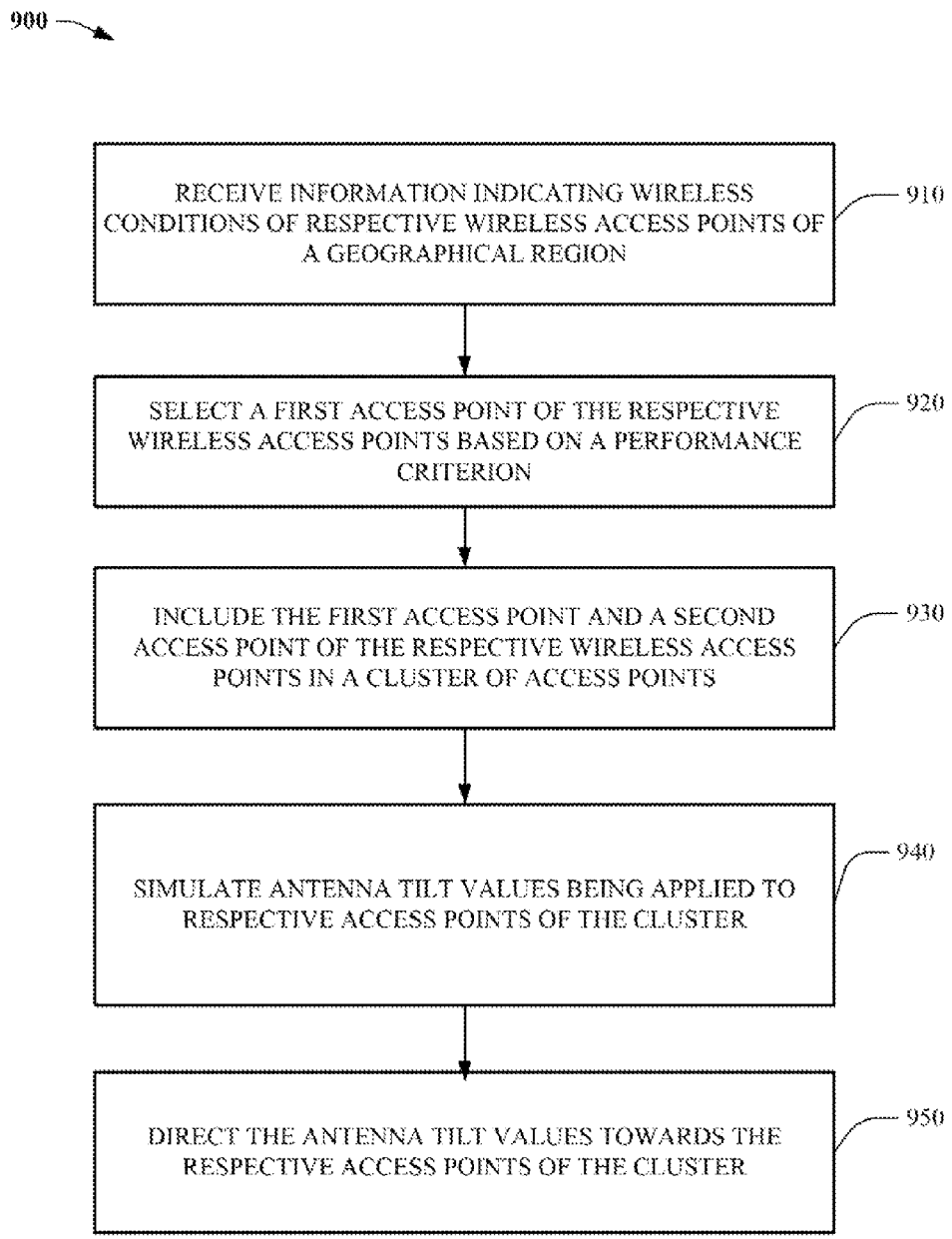

Referring now to FIG. 9, information indicating wireless conditions of respective wireless access points of a geographical region can be received, at 910, e.g., from the respective wireless access points. At 920, a first access point of the respective wireless access points can be accepted based on a performance criterion. At 930, the first access point and a second access point, e.g., associated with a wireless coverage area of the first access point, can be included in a cluster of access points, or a representation of the cluster of the access points. At 940, a simulation of antenna tilt values being applied to respective access points of the cluster can be performed. At 950, the antenna tilt values can be directed towards, e.g., component(s) of, etc. the respective access points of the cluster.

Figure 10:
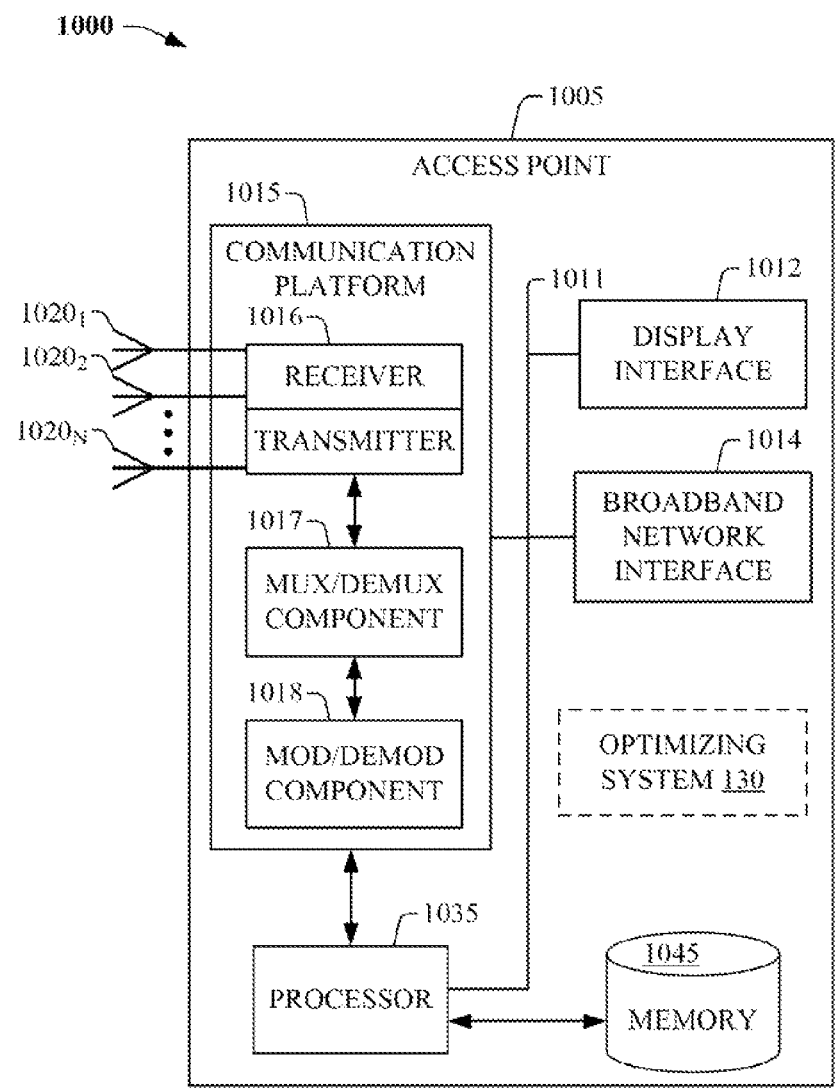
FIG. 10 illustrates a block diagram of an access point, in accordance with an embodiment.
Figure 11:
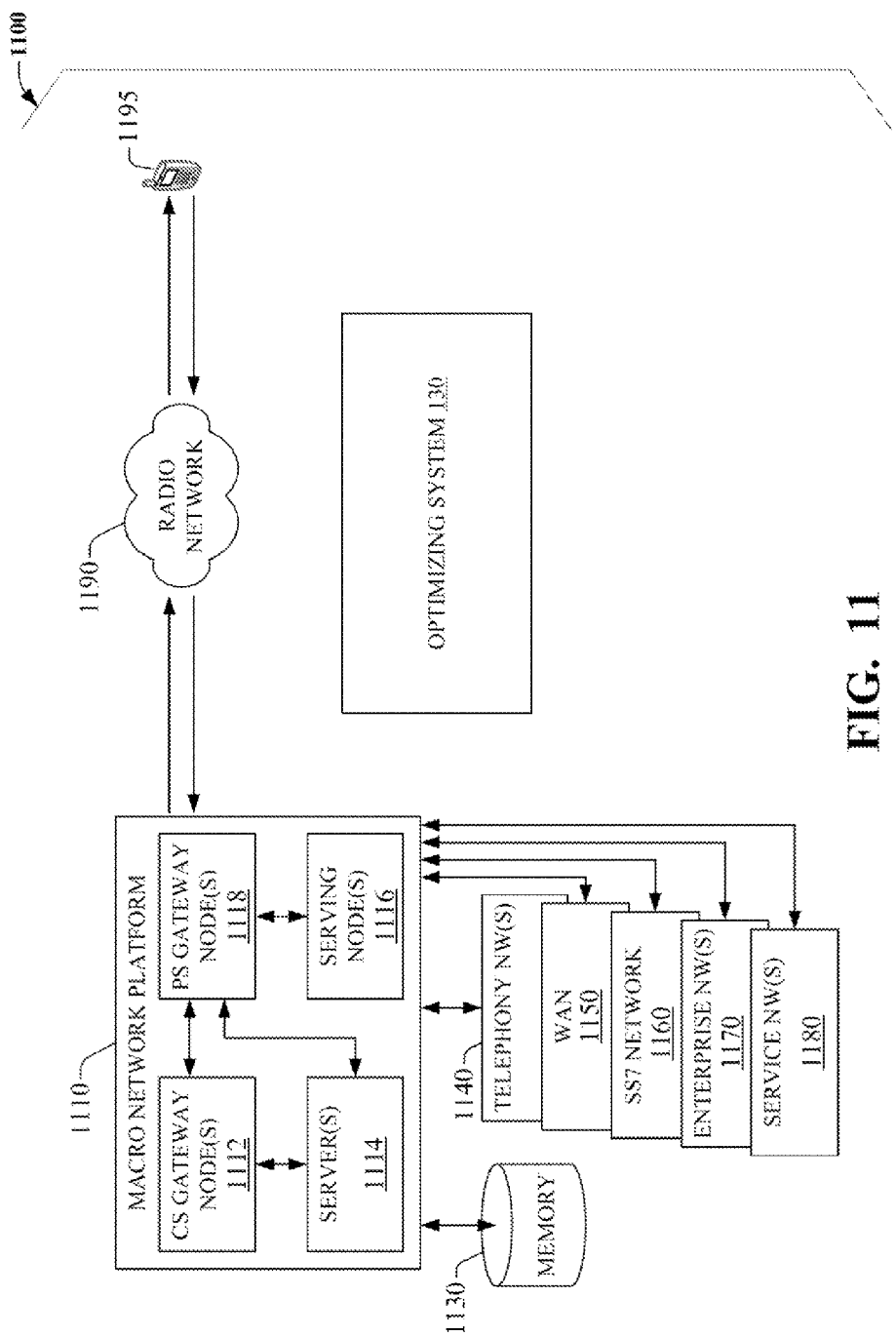
FIG. 11 illustrates a block diagram of a wireless network environment, in accordance with an embodiment.

To provide further context for various aspects of the disclosed subject matter, FIGS. 10 and 11 illustrate, respectively, a block diagram of an embodiment 1000 of an access point (AP) 1005 that can enable or exploit features and/or aspects of the disclosed subject matter; and a wireless network environment 1100 that includes macro network platform 1110, which can enable aspects or feature of a mobile network platform as described herein, and AP 1005 that exploits various aspects of the subject specification. In embodiment 1000, AP 1005 can receive and transmit signal(s) from and to wireless devices, e.g., access points, access terminals, wireless ports and routers, or the like, through a set of antennas 1020$_1$-1020$_N$ (N is a positive integer). Antennas 1020$_1$-1020$_N$ are a part of communication platform 1015, which comprises electronic components and associated circuitry that provides for processing and manipulation of received signal(s) and signal(s) to be transmitted.

In an aspect, communication platform 1015 includes a receiver/transmitter 1016 that can convert analog signals to digital signals upon reception of the analog signals, and convert digital signals to analog signals upon transmission. In addition, receiver/transmitter 1016 can divide a single data stream into multiple, parallel data streams, or perform the reciprocal operation. A multiplexer/demultiplexer 1017 can be coupled to receiver/transmitter 1016, the multiplexer/demultiplexer 1017 facilitates manipulation of signal(s) in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art, e.g., Hadamard-Walsh codes, Baker codes, Kasami codes, polyphase codes, etc. A modulator/demodulator 1018, which can also a part of communication platform 1015, can modulate information according to multiple modulation techniques, such as frequency modulation, amplitude modulation, e.g., M-ary quadrature amplitude modulation (QAM), with M a positive integer), phase-shift keying (PSK), etc.

AP 1005 also includes a processor 1035 configured to confer, at least in part, functionality to substantially any electronic component in AP 1005. In particular, processor 1035 can facilitate configuration of AP 1005, e.g., via one or more components of optimizing system 130. In one aspect, the one or more components of optimizing system 130 can be included in AP 1005. Additionally, AP 1005 includes display interface 1012, which can display functions that control functionality of AP 1005, or reveal operation conditions thereof. In addition, display interface 1012 can include a screen to convey information to an end user. In an aspect, display interface 1012 can be a liquid crystal display (LCD), a plasma panel, a monolithic thin-film based electrochromic display, and so on. Moreover, display interface can also include a component, e.g., speaker that facilitates communication of aural indicia, which can also be employed in connection with messages that convey operational instructions to an end user. Display interface 1012 also facilitates data entry e.g., through a linked keypad or via touch gestures, which can facilitated AP 1005 to receive external commands, e.g., restart operation.

Broadband network interface facilitates connection of AP 1005 to a macro network platform via access point backhaul link(s) (not shown in FIG. 10), which enable incoming and outgoing data flow. Broadband network interface 1014 can be internal or external to AP 1005, and it can utilize display interface 1012 for end-user interaction and status information delivery.

Processor 1035 can be functionally connected to communication platform 1015 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1035 can be functionally connected, via data, system, or address bus 1011, to display interface 1012 and broadband network interface 1014 to confer, at least in part functionality to each of such components.

In AP 1005, memory 1045 can retain location and/or home macro sector identifier(s); access list(s) that authorize access to wireless coverage through AP 1005; sector intelligence that includes ranking of macro sectors in the macro wireless environment of AP 1005, radio link quality and strength associated therewith, or the like. Memory 1045 also can store data structures, code instructions and program modules, system or device information, code sequences for scrambling, spreading and pilot transmission, AP floor plan configuration, and so on. Processor 1035 can be coupled, e.g., via a memory bus, to memory 1045 in order to store and retrieve information necessary to operate and/or confer functionality to the components, platform, and interfaces that reside within AP 1005.

With respect to FIG. 11, wireless communication environment 1100 includes optimizing system 130 and macro network platform 1110, which serves or facilitates communication with mobile device 1195 via radio network 1190. It should be appreciated that in cellular wireless technologies (e.g., 3GPP UMTS, HSPA, 3GPP LTE, 3GPP2 UMB), macro network platform 1110 is embodied in a core network. It is noted that radio network 1190 can include base station(s), base transceiver station(s), or access point(s), and associated electronic circuitry and deployment site(s), in addition to a wireless radio link operated in accordance with the base station(s). Accordingly, radio network 1190 can comprise various coverage cells like macro cell 105. In addition, it should be appreciated that although optimizing system 130 is illustrated in FIG. 11 as an entity distinct from other entities, elements, and/or components of wireless communication environment 1100, optimizing system 130, and/or elements/components thereof, can be located/included within one or more components/elements, e.g., hardware, software, etc., of wireless communication environment 1100, e.g., macro network platform 1110, radio network 1190, and/or mobile device 1195.

Generally, macro platform 1110 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 1110 includes CS gateway node(s) 1112 which can interface CS traffic received from legacy networks like telephony network(s) 1140, e.g., public switched telephone network (PSTN), or public land mobile network (PLMN), or a SS7 network 1160. Circuit switched gateway 1112 can authorize and authenticate traffic, e.g., voice, arising from such networks. Additionally, CS gateway 1112 can access mobility or roaming data generated through SS7 network 1160; for instance, mobility data stored in a VLR, which can reside in memory 1130. Moreover, CS gateway node(s) 1112 interfaces CS-based traffic and signaling and gateway node(s) 1118. As an example, in a 3GPP UMTS network, PS gateway node(s) 1118 can be embodied in gateway GPRS support node(s) (GGSN).

In addition to receiving and processing CS-switched traffic and signaling, PS gateway node(s) 1118 can authorize and authenticate PS-based data sessions with served, e.g., through macro RAN, wireless devices. Data sessions can include traffic exchange with networks external to the macro network platform 1110, like wide area network(s) (WANs) 1150; enterprise networks (NWs) 1170, e.g., enhanced 911, or service NW(s) 1180 like IP multimedia subsystem (IMS). It should be appreciated that local area network(s) (LANs), which may be a part of enterprise NW(s), can also be interfaced with macro network platform 1110 through PS gateway node(s) 1118. Packet-switched gateway node(s) 1118 generates packet data contexts when a data session is established. To that end, in an aspect, PS gateway node(s) 1118 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1114. It is to be noted that in 3GPP UMTS network(s), PS gateway node(s) 1118 (e.g., GGSN) and tunnel interface (e.g., TTG) comprise a packet data gateway (PDG).

Macro network platform 1110 also includes serving node(s) 1116 that can convey the various packetized flows of information, or data streams, received through PS gateway node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 1110. Data streams can be conveyed to PS gateway node(s) 1118 for authorization/authentication and initiation of a data session, and to serving node(s) 1116 for communication thereafter. Server(s) 1114 can also effect security, e.g., implement one or more firewalls, of macro network platform 1110 to ensure network's operation and data integrity in addition to authorization and authentication procedures that CS gateway node(s) 1112 and PS gateway node(s) 1118 can enact. Moreover, server(s) 1114 can provision services from external network(s), e.g., WAN 1150, or Global Positioning System (GPS) network(s), which can be a part of enterprise NW(s) 1180. It is to be noted that server(s) 1114 can include one or more processors configured to confer at least in part the functionality of macro network platform 1110. To that end, the one or more processors can execute code instructions stored in memory 1130, for example.

In example wireless environment 1100, memory 1130 stores information related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN 1150, SS7 network 1160, enterprise NW(s) 1170, or service NW(s) 1180.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of mobile wireless devices. A processor can also be implemented as a combination of computing processing units.

In the subject specification, terms such as "store", "data store", "data storage", "database", "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, which can be included in memory 1045, memory 1130, non-volatile memory 1222 (see below), disk storage 1224 (see below), and memory storage 1246 (see below) can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM can include forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
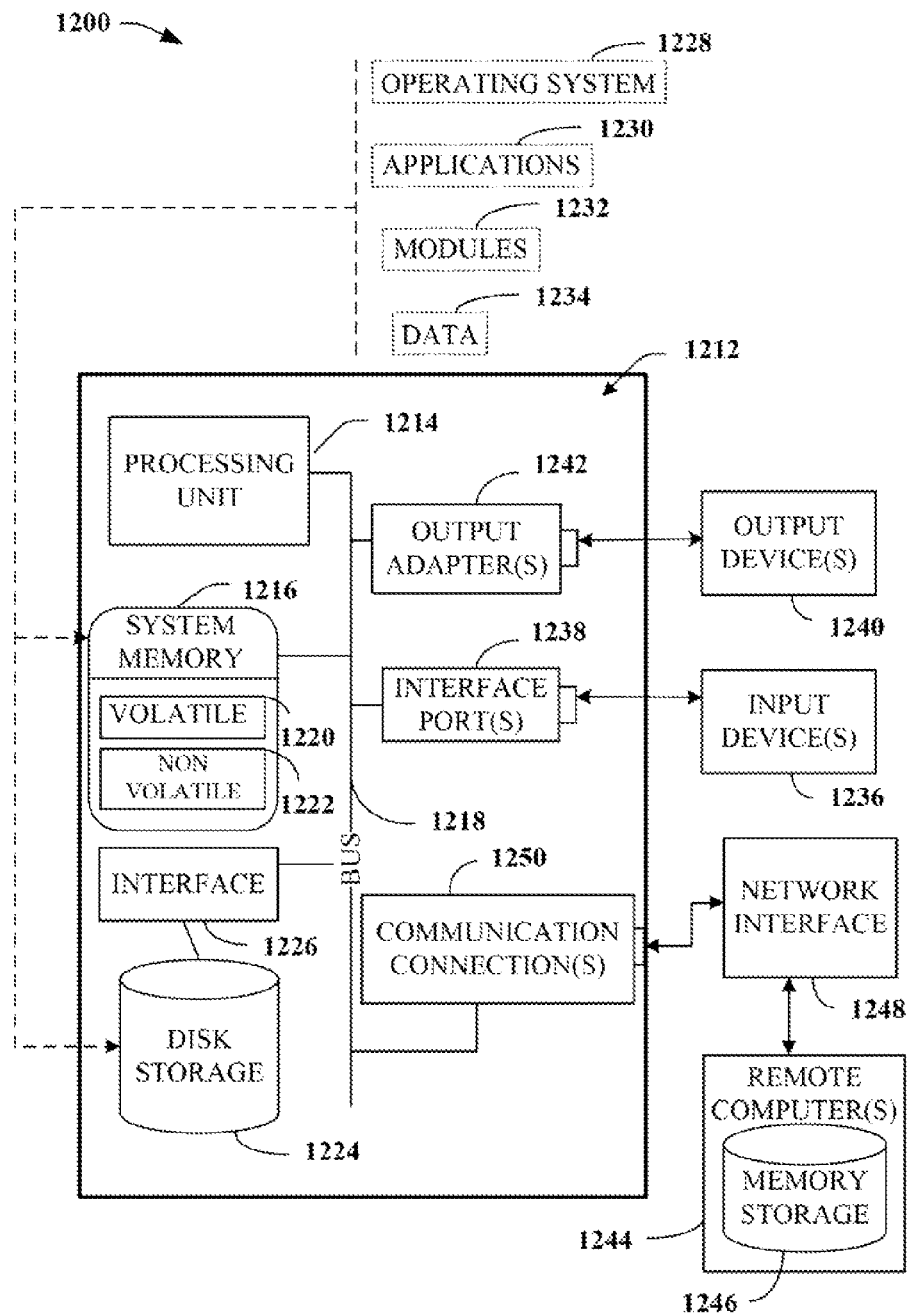
FIG. 12 is a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented, e.g., various systems and/or processes associated with FIGS. 1-11. While the subject matter has been described above in the general context of computer-executable instructions of a computer program that runs on a computer and/or computers, those skilled in the art will recognize that various aspects disclosed herein can be implemented in combination with other program modules. Program modules can include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM can include forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media, networked attached storage (NAS), e.g., SAN storage, etc. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface can be used, such as interface 1226.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

FIG. 12 describes software that acts as an intermediary between users and computer resources described in suitable operating environment 1200. Such software includes an operating system 1228. Operating system 1228, which can be stored on disk storage 1224, acts to control and allocate resources of computer 1212. System applications 1230 utilize the management of resources by operating system 1228 through program modules 1232 and program data 1234 stored either in system memory 1216 or on disk storage 1224. The disclosed subject matter can be implemented with various operating systems or combinations of operating systems.

A user can enter commands or information into computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1214 through system bus 1218 via interface port(s) 1238. Interface port(s) 1238 include, for example, a serial port, a parallel port, a game port, and a universal serial bus (USB). Output device(s) 1240 use some of the same type of ports as input device(s) 1236.

Thus, for example, a USB port can be used to provide input to computer 1212 and to output information from computer 1212 to an output device 1240. Output devices 1240 like monitors, speakers, and printers, among other output devices 1240, can use special adapters such as output adapters 1242. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and can include many or all of the elements described relative to computer 1212.

For purposes of brevity, only a memory storage device 1246 is illustrated with remote computer(s) 1244. Remote computer(s) 1244 can be logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a system comprising a processor, information representing wireless conditions of wireless access point devices;
selecting, by the system based on a criterion, a first target access point device of the wireless access point devices;
creating, by the system based on data received by the first target access point device from a mobile device, a first representation of a first cluster of the wireless access point devices comprising the first target access point device and a first neighbor access point device, wherein the first target access point corresponds to a first wireless coverage area that is adjacent to a second wireless coverage area of the first neighbor access point device; and
in response to estimating an impact of an application of antenna tilt parameters corresponding to a first wireless access technology based on a portion of the information that is associated with a selected access point device of the first cluster of the wireless access point devices, selecting, by the system, the antenna tilt parameters for the first cluster of the wireless access point devices, wherein the selected access point device is associated with a second wireless access technology different from the first wireless access technology.

2. The method of claim 1, wherein the creating the first representation of the first cluster comprises selecting the first neighbor access point device for the first cluster in response to the second wireless coverage area being determined to overlap the first wireless coverage area.

3. The method of claim 1, wherein the creating the first representation of the first cluster comprises selecting the first neighbor access point device for the first cluster based on a portion of the information being determined to correspond to the mobile device.

4. The method of claim 3, wherein the selecting the first neighbor access point device comprises selecting the first neighbor access point device based on a measurement that has been performed by the mobile device.

5. The method of claim 1, further comprising:
directing, by the system, the antenna tilt parameters towards respective components of the first cluster of the access point devices.

6. The method of claim 1, further comprising:
creating, by the system, a second representation of a second cluster comprising a second target access point device of the wireless access point devices and a second neighbor access point device of the wireless access point devices; and
in response to the first cluster being determined to include the second target access point device, merging, by the system, the first representation of the first cluster with the second representation of the second cluster to obtain a representation of a merged cluster.

7. The method of claim 6, further comprising:
in response to estimating changes of tilt of antennas of the merged cluster, determining, by the system, other antenna tilt parameters for the merged cluster.

8. The method of claim 1, wherein the determining the antenna tilt parameters for the first cluster of the wireless access point devices comprises determining the antenna tilt parameters based on locations of mobile devices communicatively coupled to the first cluster of the wireless access point devices.

9. A system, comprising:
a processor; and
a memory that stores executable instructions that, when executed by the processor, facilitate performance of operations, comprising:
receiving information representing wireless conditions of wireless access point devices;
selecting, based on a performance criterion, a first access point device of the wireless access point devices;
grouping, based on data received by the first access point device from a mobile device, the first access point device and a second access point device of the wireless access point devices into a representation of a cluster of access point devices, wherein the first access point device corresponds to a first wireless coverage area that is adjacent to a second wireless coverage area of the second access point device; and
in response to determining an effect of an application of antenna tilt values corresponding to a first wireless access technology based on a portion of the information that is associated with to a selected access point device of the cluster that is associated with a second wireless access technology that is different from the first wireless access technology, selecting the antenna tilt values for the cluster.

10. The system of claim 9, wherein the second access point device is within a wireless coverage area of the first access point device.

11. The system of claim 9, wherein the grouping comprises grouping the first access point device and the second access point device into the representation of the cluster of the access point devices based on a portion of the information corresponding to the mobile device.

12. The system of claim 11, wherein the portion of the information is associated with a measurement that has been performed by the mobile device.

13. The system of claim 9, wherein the determining comprises estimating an impact of the application of the antenna tilt values to the first cluster of the access point devices based on signal strength and quality indicators associated with the wireless conditions.

14. The system of claim 9, wherein the operations further comprise:
merging the first cluster of the access point devices with a second cluster of access point devices to obtain a disjoint cluster of access point devices; and
deriving other antenna tilt values for the disjoint cluster of access point devices.

15. The system of claim 9, wherein the operations further comprise:
directing a change of the antenna tilt values to the first cluster of the access point devices.

16. The system of claim 15, wherein the operations further comprise:
in response to the directing of the change of the antenna tilt values, monitoring wireless conditions of the first cluster of the access point devices; and
in response to the wireless conditions being determined to satisfy a criterion with respect to a performance of the first cluster of the access point devices, directing another change of the antenna tilt values to the first cluster of the access point devices.

17. The system of claim 9, wherein the operations further comprise
deriving the antenna tilt values based on locations of mobile devices communicatively coupled to the first cluster of the access point devices.

18. A non-transitory computer-readable storage device comprising executable instructions that, in response to execution, cause a device comprising a processor to perform operations, comprising:
receiving information representing wireless conditions of wireless access point devices;
selecting a first access point device of the wireless access point devices based on a performance criterion;
grouping, based on data received by the first access point device from a mobile device, the first access point device and a second access point device of the wireless access point devices into a cluster of access point devices, wherein the first access point device corresponds to a first wireless coverage area that is adjacent to a second wireless coverage area of the second access point device; and
in response to determining an impact of an application of antenna tilt values corresponding to a first wireless technology based on a portion of the information that is associated with a selected access point device of the cluster of the access point devices that is associated with a second wireless technology that is different from the first wireless access technology, selecting the antenna tilt values for the cluster of the access point devices.

19. The non-transitory computer-readable storage device of claim 18, wherein the operations further comprise:
directing information representing the antenna tilt values towards an access point device of the cluster of the access point devices.

* * * * *